US010078422B2

(12) United States Patent
Gao et al.

(10) Patent No.: US 10,078,422 B2
(45) Date of Patent: Sep. 18, 2018

(54) METHOD AND DEVICE FOR UPDATING A LIST

(71) Applicant: Xiaomi Inc., Beijing (CN)

(72) Inventors: Yi Gao, Beijing (CN); Hongqiang Wang, Beijing (CN); Hai Long, Beijing (CN)

(73) Assignee: Xiaomi Inc., Beijing (CN)

( * ) Notice: Subject to any disclaimer, the term of this patent is extended or adjusted under 35 U.S.C. 154(b) by 557 days.

(21) Appl. No.: 14/731,896

(22) Filed: Jun. 5, 2015

(65) Prior Publication Data

US 2016/0041701 A1   Feb. 11, 2016

Related U.S. Application Data

(63) Continuation of application No. PCT/CN2015/074609, filed on Mar. 19, 2015.

(30) Foreign Application Priority Data

Aug. 6, 2014   (CN) .......................... 2014 1 0384387

(51) Int. Cl.
G06F 3/14   (2006.01)
G06F 3/0482   (2013.01)
G06F 3/0488   (2013.01)
G06F 3/0484   (2013.01)

(52) U.S. Cl.
CPC .......... *G06F 3/0482* (2013.01); *G06F 3/0488* (2013.01); *G06F 3/04847* (2013.01); *G06F 2203/04808* (2013.01)

(58) Field of Classification Search
CPC ..................................... G06F 3/14; G06F 3/17

USPC .......................... 715/702, 773, 825; 705/26.7
See application file for complete search history.

(56) References Cited

U.S. PATENT DOCUMENTS

| 2010/0162179 | A1 | 6/2010 | Porat |
| 2010/0199180 | A1 | 8/2010 | Brichter |
| 2011/0161853 | A1 | 6/2011 | Park |
| 2012/0013540 | A1 | 1/2012 | Hogan |
| 2012/0210214 | A1* | 8/2012 | Yoo ........................ G06F 3/0482 715/702 |

(Continued)

FOREIGN PATENT DOCUMENTS

| CN | 101447940 A | 6/2009 |
| CN | 102768617 A | 11/2012 |

(Continued)

OTHER PUBLICATIONS

Extended European Search Report for European Application No. 15180010.9-1507 dated Jan. 7, 2016.

(Continued)

*Primary Examiner* — Ruay Ho
(74) *Attorney, Agent, or Firm* — Finnegan, Henderson, Farabow, Garrett & Dunner LLP

(57) ABSTRACT

A method for a device to update a list displayed on the device, includes: acquiring a triggering signal with respect to a first list item and a second list item adjacent to the first list item among a plurality of list items of the list displayed on the device, the triggering signal being configured to trigger updating the list; obtaining at least one updating list item according to list data for updating the list; and displaying the at least one updating list item between the first list item and the second list item.

9 Claims, 8 Drawing Sheets

(56) References Cited

U.S. PATENT DOCUMENTS

| | | | |
|---|---|---|---|
| 2013/0086505 A1* | 4/2013 | de Paz | G06F 3/1438 |
| | | | 715/773 |
| 2013/0144750 A1* | 6/2013 | Brown | G06Q 30/0631 |
| | | | 705/26.7 |
| 2013/0227486 A1 | 8/2013 | Brinda | |

FOREIGN PATENT DOCUMENTS

| | | |
|---|---|---|
| CN | 103095748 A | 5/2013 |
| CN | 103164128 A | 6/2013 |
| CN | 103294391 A | 9/2013 |
| CN | 103390014 A | 11/2013 |
| CN | 103473226 A | 12/2013 |
| CN | 103559223 A | 2/2014 |
| CN | 103581280 A | 2/2014 |
| CN | 103699553 A | 4/2014 |
| CN | 104156245 A | 11/2014 |
| EP | 2 743 817 A1 | 12/2012 |
| JP | 2012-527686 A | 11/2012 |
| KR | 10-2013-0097970 A | 9/2013 |
| KR | 10-2013-0104278 A | 9/2013 |
| KR | 10-2014-0079752 A | 6/2014 |
| RU | 2010116141 A | 11/2011 |
| WO | WO 2013/137544 A1 | 9/2013 |

OTHER PUBLICATIONS

European Office Action for European Application No. 15 180 010.9 dated Jun. 13, 2017.

Russian Office Action for Russian Application No. 2015123563/08(036767) dated Sep. 14, 2016.

International Search Report for PCT/CN2015/074609 dated May, 12, 2015.

\* cited by examiner

METHOD AND DEVICE FOR UPDATING A LIST

CROSS-REFERENCE TO RELATED APPLICATIONS

The present application is a continuation of International Application No. PCT/CN2015/074609, filed Mar. 19, 2015, which is based upon and claims priority to Chinese Patent Application No. 201410384387.5, filed Aug. 6, 2014, the entire contents of all of which are incorporated herein by reference.

TECHNICAL FIELD

The present disclosure generally relates to the field of computer and Internet technology and, more particularly, to a method and a device for updating a list.

BACKGROUND

When an application program loads data, a typical displaying method is displaying the data in a list form. A list typically contains a plurality of list items arranged in order along a longitudinal direction or a transverse direction, and each of the list items corresponds to a set of list data.

A user may browse list data corresponding to each of the list items in the order of the list items by scrolling the list. When the application program prompts the user that there is new list data, the user may scroll the list to the top or the bottom of the list. Then, an updating list item corresponding to list data for updating the list may be displayed before the first list item or after the last list item in the list. For instance, microblogs are generally displayed as a list, with each microblog corresponding to a list item. If the user wants to refresh the micro-blogs displayed on a touch-screen device, the user typically needs to scroll down the list to the first list item at the top of the list, and further draw down the list to trigger updating the list. Then an updating list item corresponding to a new microblog may be displayed before the first list item in the list.

SUMMARY

According to a first aspect of the present disclosure, there is provided a method for a device to update a list displayed on the device, comprising: acquiring a triggering signal with respect to a first list item and a second list item adjacent to the first list item among a plurality of list items of the list displayed on the device, the triggering signal being configured to trigger updating the list; obtaining at least one updating list item according to list data for updating the list; and displaying the at least one updating list item between the first list item and the second list item.

According to a second aspect of the present disclosure, there is provided a device, comprising: a processor; and a memory for storing instructions executable by the processor; wherein the processor is configured to: acquire a triggering signal with respect to a first list item and a second list item adjacent to the first list item among a plurality of list items of a list displayed on the device, the triggering signal being configured to trigger updating the list; obtain at least one updating list item according to list data for updating the list; and display the at least one updating list item between the first list item and the second list item.

According to a third aspect of the present disclosure, there is provided a non-transitory computer-readable storage medium storing instructions that, when executed by a processor of a device, cause the device to perform a method for updating a list displayed on the device, the method comprising: acquiring a triggering signal with respect to a first list item and a second list item adjacent to the first list item among a plurality of list items of the list displayed on the device, the triggering signal being configured to trigger updating the list; obtaining at least one updating list item according to list data for updating the list; and displaying the at least one updating list item between the first list item and the second list item.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
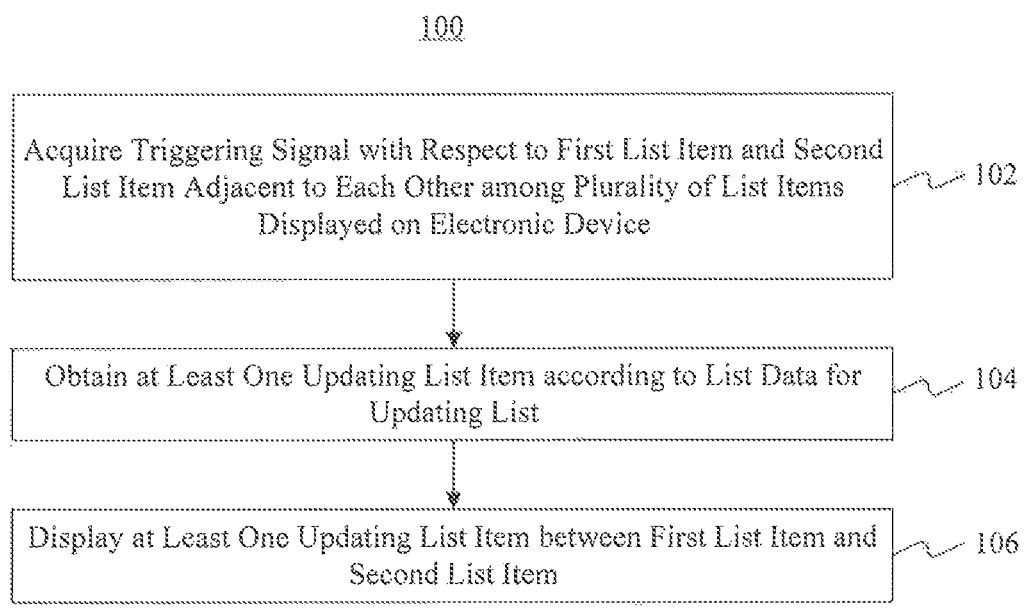
FIG. 1 is a flow chart of a method for updating a list, according to an exemplary embodiment.

FIG. 1 is a flow chart of a method 100 for updating a list, according to an exemplary embodiment. For example, the method 100 is used in an electronic device, such as a mobile phone, a tablet, an e-book reader, a multimedia player, a personal digital assistant and the like. Referring to FIG. 1, the method 100 includes the following steps.

In step 102, a triggering signal with respect to a first list item and a second list item adjacent to each other among a plurality of list items of the list, e.g., N list items (N≥2 and being an integer), displayed on the electronic device is acquired. For example, the triggering signal is configured to trigger updating the list.

In step 104, at least one updating list item is obtained according to list data for updating the list.

In step 106, the at least one updating list item is displayed on the electronic device between the first list item and the second list item.

The method 100 simplifies user operations fir triggering list updating, thereby improving the updating efficiency.

Figure 2A:
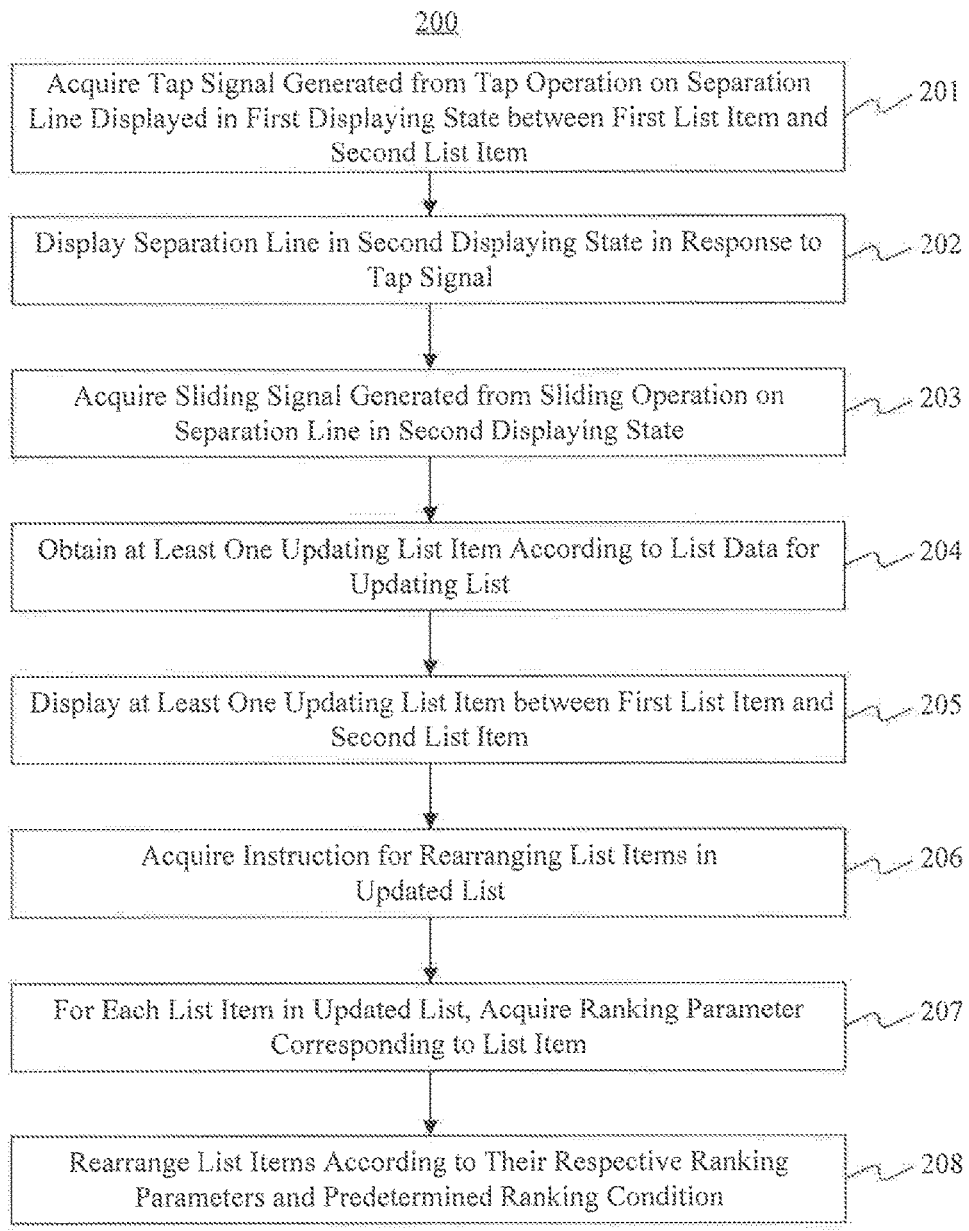
FIG. 2A is a flow chart of a method for updating a list, according to an exemplary embodiment.

FIG. 2A is a flow chart of a method 200 for updating a list, according to an exemplary embodiment. For example, the method 200 is used in an electronic device, such as a mobile phone, a tablet, an c-book reader, a multimedia player, a personal digital assistant and the like. Referring to FIG. 2, the method 200 includes the following steps.

In step 201, a tap signal generated from a tap operation on a separation line displayed in a first displaying state between a first list item and a second list item of the list is acquired.

In exemplary embodiments, the first list item and the second list item are two adjacent list items among a plurality of list items of the list, e.g., N list items (N≥2 and N being an integer), displayed on the electronic device.

In exemplary embodiments, when a user is browsing list data in the list, if there is list data for updating the list, the electronic device generates and displays a prompt message for prompting the user for the new list data.

Figure 2B:
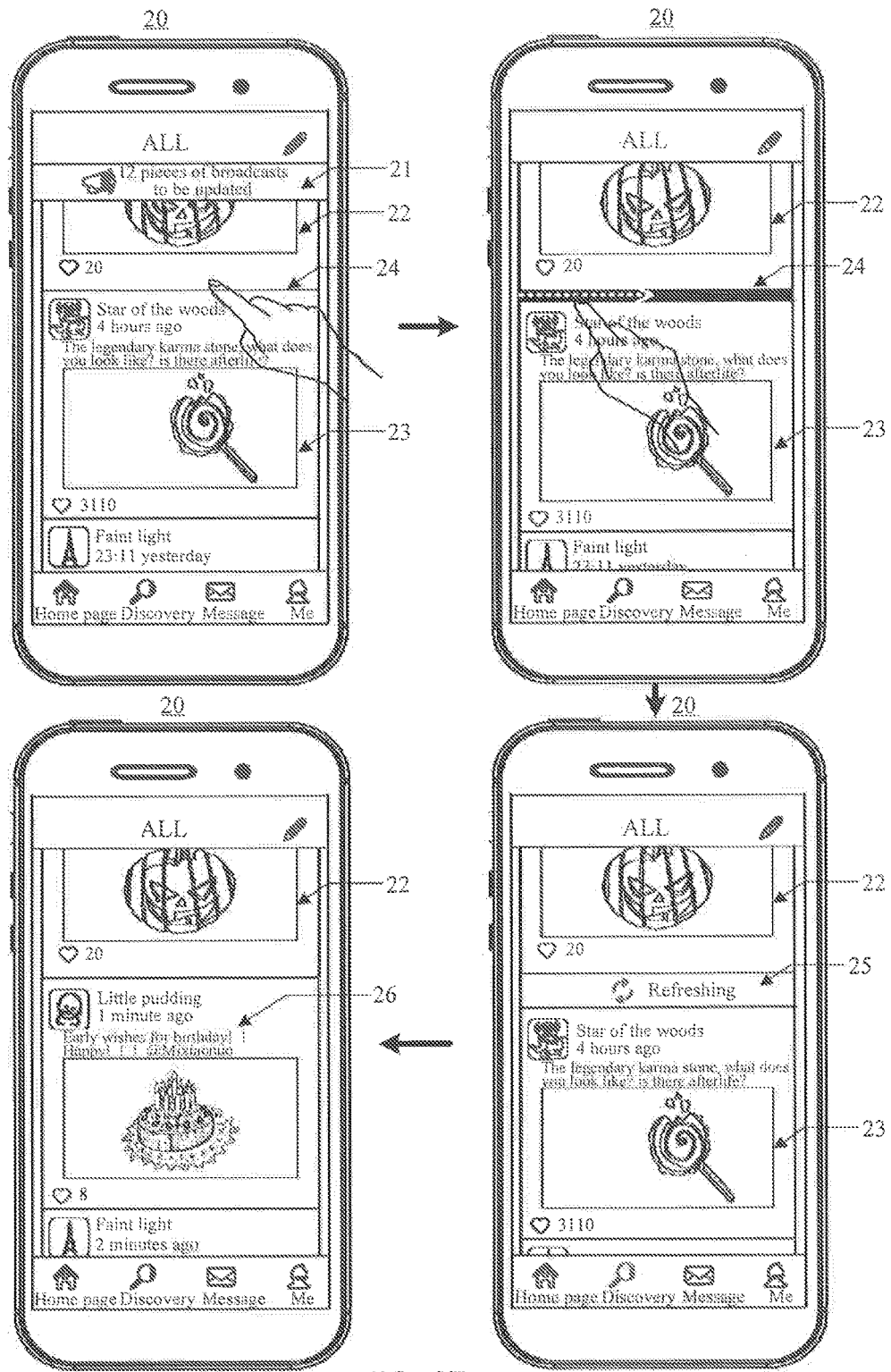
FIG. 2B is a schematic diagram of a user interface for updating a list, according to an exemplary embodiment.

FIG. 2B is a schematic diagram of an interface 20 for updating the list, according to an exemplary embodiment. In the exemplary embodiment, the electronic device receives an update notification, sent from a server, to notify the electronic device that there is list data for updating the list. After receiving the update notification, the electronic device generates and displays an update prompt message 21. Referring to the upper left of FIG. 2B, for example, the update prompt message 21 is displayed at the top of the interface 20.

In exemplary embodiments, if the user wants to update the list to read new list data, a triggering operation can be performed with respect to the first list item and the second list item adjacent to each other among the N complete or incomplete list items displayed on the interface 20, to generate a triggering signal. An updating list item corresponding to list data for updating the list may be inserted between the first list item and the second list item displayed on the electronic device, which are selected by the user.

In exemplary embodiments, to distinguish different list items, two adjacent list items are separated by a separation line. The separation line may be a line segment, or may be a long strip shaped blank area, or any other patterns for separating different list items.

In exemplary embodiments, the updating of the list can be triggered by a first operation and a second operation following the first operation. For example, the first operation is a tapping operation on the separation line displayed in the first displaying state between the first list item and the second list item. In order to prevent an inadvertent operation, the tap operation may be a long press operation. Correspondingly, the electronic device acquires the tap signal generated from the tapping operation on the separation line displayed in the first displaying state between the first list item and the second list item. For example, the first displaying state is a normal displaying state.

Referring to the upper left of FIG. 2B, for example, the user long presses a separation line 24 displayed in the first displaying state between a first list item 22 and a second list item 23.

Referring to FIG. 2A, in step 202, the separation line is displayed in a second displaying state in response to the tap signal.

In exemplary embodiments, after acquiring the tap signal, the electronic device displays the separation line in the second displaying state. The change in the displaying state of the separation line prompts the user that an operation corresponding to the change is triggering updating the list. For example, the second displaying state may be displaying the separation line as a thicker line, or displaying the separation line in a zipper form, or may be any other displaying state different from the first displaying state.

Referring to the upper right of FIG. 2B, for example, after the user long presses the separation line 24 in the first displaying state, the electronic device displays the separation line 24 as a thicker line.

Referring back to FIG. 2A, in step 203, a sliding signal generated from a sliding operation. i.e., the second operation, on the separation line in the second displaying state is acquired.

In exemplary embodiments, the sliding operation (the second operation) by the user on the separation line in the second displaying state triggers the electronic device to generate the sliding signal. A length of a sliding path and a direction of the sliding operation to trigger the electronic device to generate the sliding signal may be preset based on practical situations, and the present embodiment does not impose specific limitations on them.

Referring to the upper right of FIG. 2B, for example, the user slides a finger on the separation line 24 in the second displaying state from left to right. Correspondingly, as shown in the lower right of FIG. 2B, after acquiring the sliding signal, the electronic device displays a refresh prompt message 25 "refreshing" between the first list item 22 and the second list item 23, so as to prompt the user that list refreshing is being performed.

In addition, in order to prevent an inadvertent operation (e.g., the user, when sliding the list up and down during browsing list data, touches the separation line, thereby causing the electronic device to mistakenly consider that the user needs to update the list), after acquiring the tap signal, the electronic device may further detect whether the N list items are in a stationary displaying state. If the N list items are in the stationary displaying state, step 203 is performed. Otherwise, the separation line is kept to be displayed in the first displaying state.

Referring back to FIG. 2A, in step 204, at least one updating list item is obtained according to list data for updating the list.

In exemplary embodiments, when the electronic device needs to acquire list data for updating the list from the server, the list data may be acquired from the server after the triggering signal is acquired. Alternatively and/or additionally, the list data may be acquired directly from the server and buffered locally after an update notification sent from the server is received.

After acquiring the list data for updating the list, the electronic device parses the list data into at least one updating list item, which corresponds to a set of updating list data.

In step 205, the at least one updating list item is displayed between the first list item and the second list item.

For example, the electronic device displays the at least one updating list item between the first list item and the second list item selected by the user, and displays the at least one updating list item complete or incomplete according to a size of a displaying range.

Referring to the lower left of FIG. 2B, for example, after obtaining an updating list item 26, the electronic device hides the refreshing prompt message 25, and displays the updating list item 26 below the first list item 22.

In the illustrated embodiment, because the updating list item may be instantly inserted between the first list item and the second list item being browsed by the user, it facilitates the user's browse of the updating list item and the original list data being previously browsed. In some embodiments, list data is arranged in an order according to the user's customary displaying manner. For example, list data is arranged in an order of time parameters. In these embodiments, after the user finishes the browse of the list data in the updated list, the electronic device may also rearrange list items in the updated list according to ranking parameters corresponding to the respective list items and a predetermined ranking condition, so as to enable the list items to be arranged in good order and to improve user experience. Therefore, after step 205, the method 200 may also include the following steps.

In step 206, an instruction for rearranging list items in the updated list. e.g., M list items (M≥N+1 and M being an integer), is acquired.

For example, the rearranging instruction may be triggered by the user based on practical requirements. Alternatively, a list-loading instruction triggered when the user opens an application program next time may be taken as the rearranging instruction.

In step 207, for each list item in the updated list, a ranking parameter corresponding to the list item is acquired.

For example, after acquiring the rearranging instruction, the electronic device acquires ranking parameters corresponding to the respective list items in the updated list. In practical applications, different ranking conditions correspond to different ranking parameters. For example, the ranking parameter of a list item may be a time parameter, a distance parameter, a price parameter, and the like.

In a microblog application, for example, the ranking parameter may be a time parameter. Each set of list data contains a time parameter which typically refers to a time stamp corresponding to a moment when a user publishes a piece of microblog.

In step 208, the M list items are rearranged according to their respective ranking parameters and a predetermined ranking condition.

For example, the predetermined ranking condition is arranging the list items in an ascending order of the ranking parameters, or arranging the list items in a descending order of the ranking parameters.

The method 200 simplifies user operations for updating the list, and improves the updating efficiency. The method 200 also enables list items in the updated list to be arranged in good order and improves user experience.

Figure 3A:
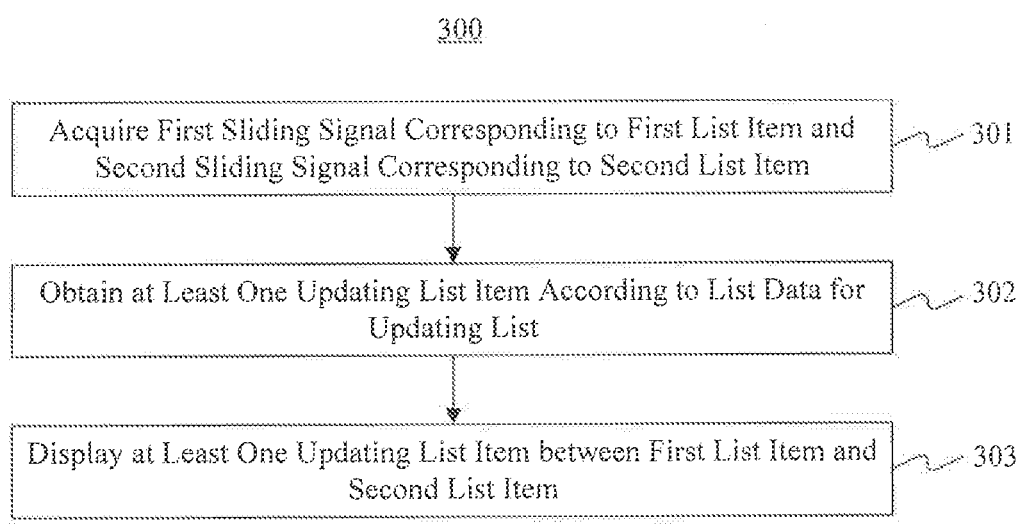
FIG. 3A is a flow chart of a method for updating a list, according to an exemplary embodiment.

FIG. 3A is a flow chart of a method 300 for updating a list, according to an exemplary embodiment. For example, the method 300 is used in an electronic device, such as a mobile phone, a tablet, an e-book reader, a multimedia player, a personal digital assistant and the like. Referring to FIG. 3, the method 300 includes the following steps.

In step 301, a first sliding signal corresponding to a first list item in the list and a second sliding signal corresponding to a second list item in the list are acquired.

In exemplary embodiments, the first list item and the second list item are two adjacent list items among a plurality of list items, e.g., N list items (N≥2 and being an integer), displayed on the electronic device.

In exemplary embodiments, the first sliding signal and the second sliding signal may be generated from first and second sliding operations, respectively, performed simultaneously or in sequence. When the first sliding signal and the second sliding signal are generated from the first and second sliding operations performed simultaneously, a time difference between a first triggering moment of the first sliding signal and a second triggering moment of the second sliding signal is less than a predetermined time threshold. When the first sliding signal and the second sliding signal are generated from the first and second sliding operations performed in sequence, a triggering order of the first and second sliding signals is not limited.

In exemplary embodiments, sliding paths and sliding directions corresponding to the first sliding signal and the second sliding signal for triggering updating the list may be preset based on practical requirements. In one exemplary embodiment, updating the list is triggered when the first sliding signal and the second sliding signal are generated from the first and second sliding operations, respectively, in opposite directions, which can be determined when an included angle formed by a first direction opposite to the sliding direction of the first sliding operation and a second direction opposite to the sliding direction of the second sliding operation is greater than a predetermined angle threshold. For example, the predetermined angle threshold may be preset to 170 degrees.

In one exemplary embodiment, the first sliding signal is generated from the first sliding operation on the first list item in a sliding direction away from the second list item, the second sliding signal is generated from the second sliding operation on the second list item in a sliding direction away from the first list item, and the time difference between the first triggering moment of the first sliding signal and the second triggering moment of the second sliding signal is less than a predetermined time threshold.

Figure 3B:
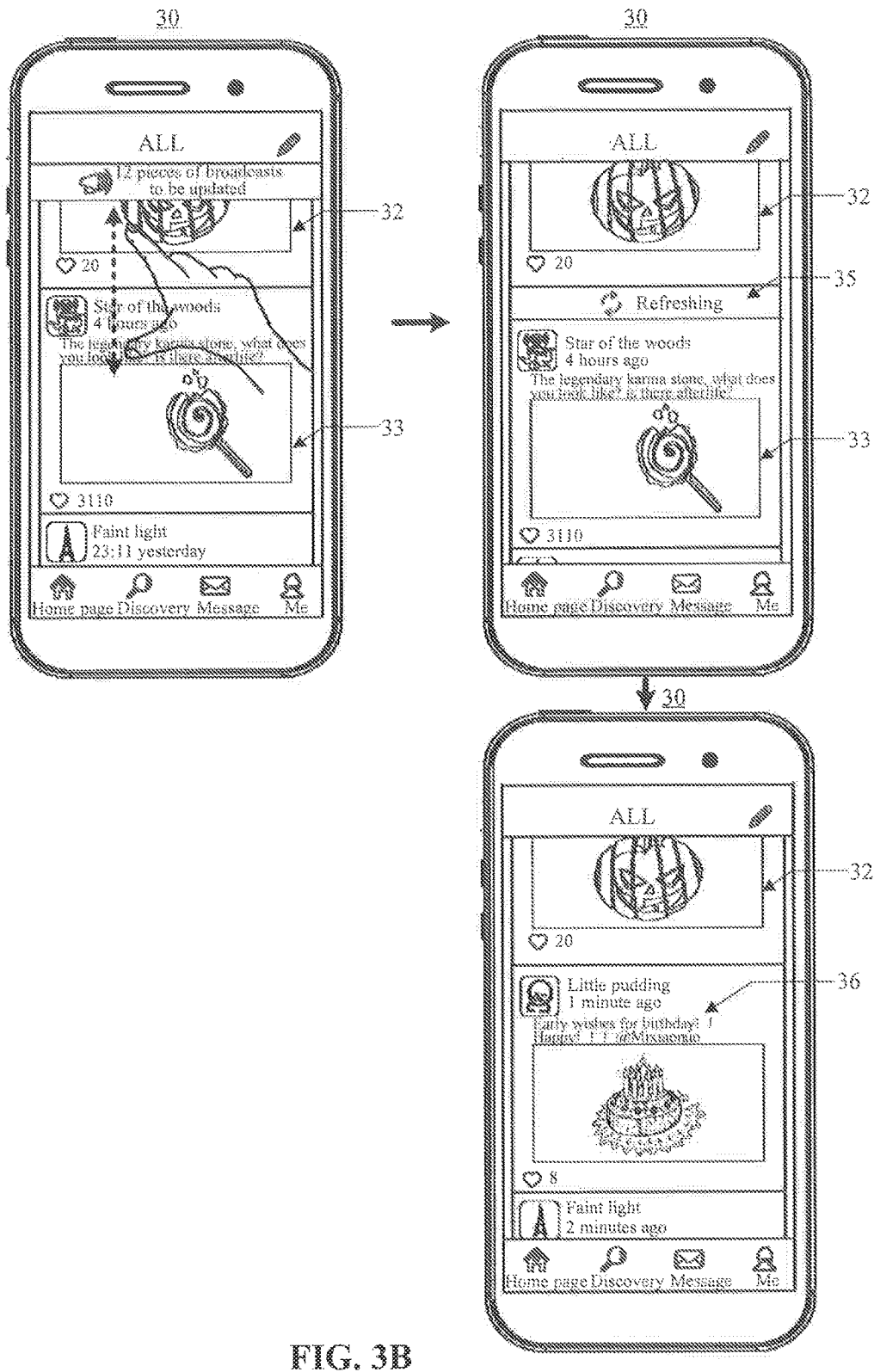
FIG. 3B is a schematic diagram of a user interface for updating a list, according to an exemplary embodiment.

FIG. 3B is a schematic diagram of an interface 30 for updating the list, according to an exemplary embodiment. For example, if the user wants to update the list, the user may simultaneously perform the first and second sliding operations in opposite directions on a first list item 32 and a second list item 33, respectively. Correspondingly, after acquiring the first and second sliding signals, the electronic device distances the first and second list items 32 and 33 along the opposite directions, and displays a refreshing prompt message 35 "refreshing" between the first list item 32 and the second list item 33.

In one exemplary embodiment, the first sliding signal is generated from the first sliding operation on the first list item in a first predetermined sliding direction along a first predetermined sliding path, and the second sliding signal is generated from the second sliding operation on the second list item in a second predetermined sliding direction along a second predetermined sliding path. The first predetermined sliding path, the first predetermined sliding direction, the second predetermined sliding path, and the second predetermined sliding direction may each be preset according to practical requirements.

In another embodiment, the first sliding signal and the second sliding signal are generated from the first and second sliding operations simultaneously performed, each along a clockwise direction and having a circular sliding path. Alternatively and/or additionally, the first sliding signal and the second sliding signal are generated from the first and second sliding operations performed in sequence, each along a diagonal direction of the interface. This is not limited in the present embodiment.

In step 302, at least one updating list item is obtained according to list data for updating the list.

In exemplary embodiments, when the electronic device needs to acquire list data for updating the list from the server, the list data may be acquired from the server after the triggering signal for triggering updating the list is acquired. Alternatively and/or additionally, the list data for updating the list may be acquired directly from the server and buffered locally after an update notification sent from the server is received.

In exemplary embodiments, after acquiring the list data for updating the list, the electronic device parses the list data into the at least one updating list item, which corresponds to a set of updating list data.

In step 303, the at least one updating list item is displayed between the first list item and the second list item.

For example, the electronic device displays the at least one updating list item between the first list item and the second list item selected by the user, and displays the at least one updating list item complete or incomplete according to a size of a displaying range.

Referring to the lower right figure in FIG. 3I, for example, after obtaining an updating list item 36, the electronic device hides the refreshing prompt message 35, and displays the updating list item 36 below the first list item 32.

The method 300 simplifies user operations for updating the list, and improves the updating efficiency.

It should be noted that, in the embodiments shown in FIGS. 2A and 3A, illustrations are made taking two exemplary operation manners for triggering updating the list as an example. In practical applications, the operation manners for triggering updating the list may be various. For example, a double tapping operation on a separation line between a first list item and a second list item may trigger updating the list. Also for example, a tapping operation on a specified button may trigger updating the list, and so on. This is not limited in the embodiments of the present disclosure.

Figure 4:
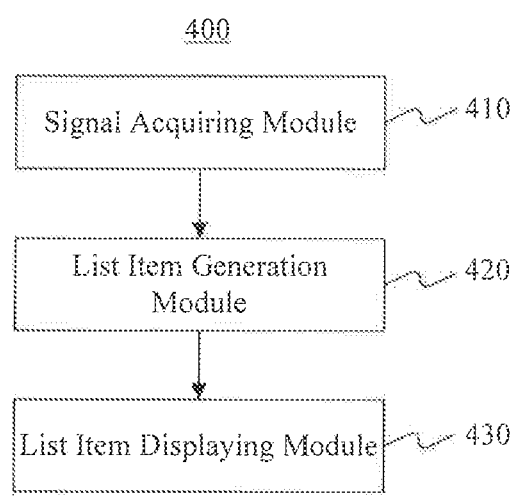
FIG. 4 is a block diagram of a device for updating a list, according to an exemplary embodiment.

FIG. 4 is a block diagram of a device 400 for updating a list, according to an exemplary embodiment. The device 400 may be a part or a whole of an electronic device, such as a mobile phone, a tablet, an e-book reader, a multimedia player, a personal digital assistant and the like, and may be implemented by software, or hardware, or a combination of the both. The device 400 includes a signal acquiring module 410, a list item generation module 420, and a list item displaying module 430.

The signal acquiring module 410 is configured to acquire a triggering signal with respect to a first list item and a second list item adjacent to each other among a plurality of list items of the list, e.g., N list items (N≥2 and being an integer), displayed on the device 400. The triggering signal is configured to trigger updating the list.

The list item generation module 420 is configured to obtain at least one updating list item according to list data for updating the list.

The list item displaying module 430 is configured to display the at least one updating list item between the first list item and the second list item.

Figure 5:
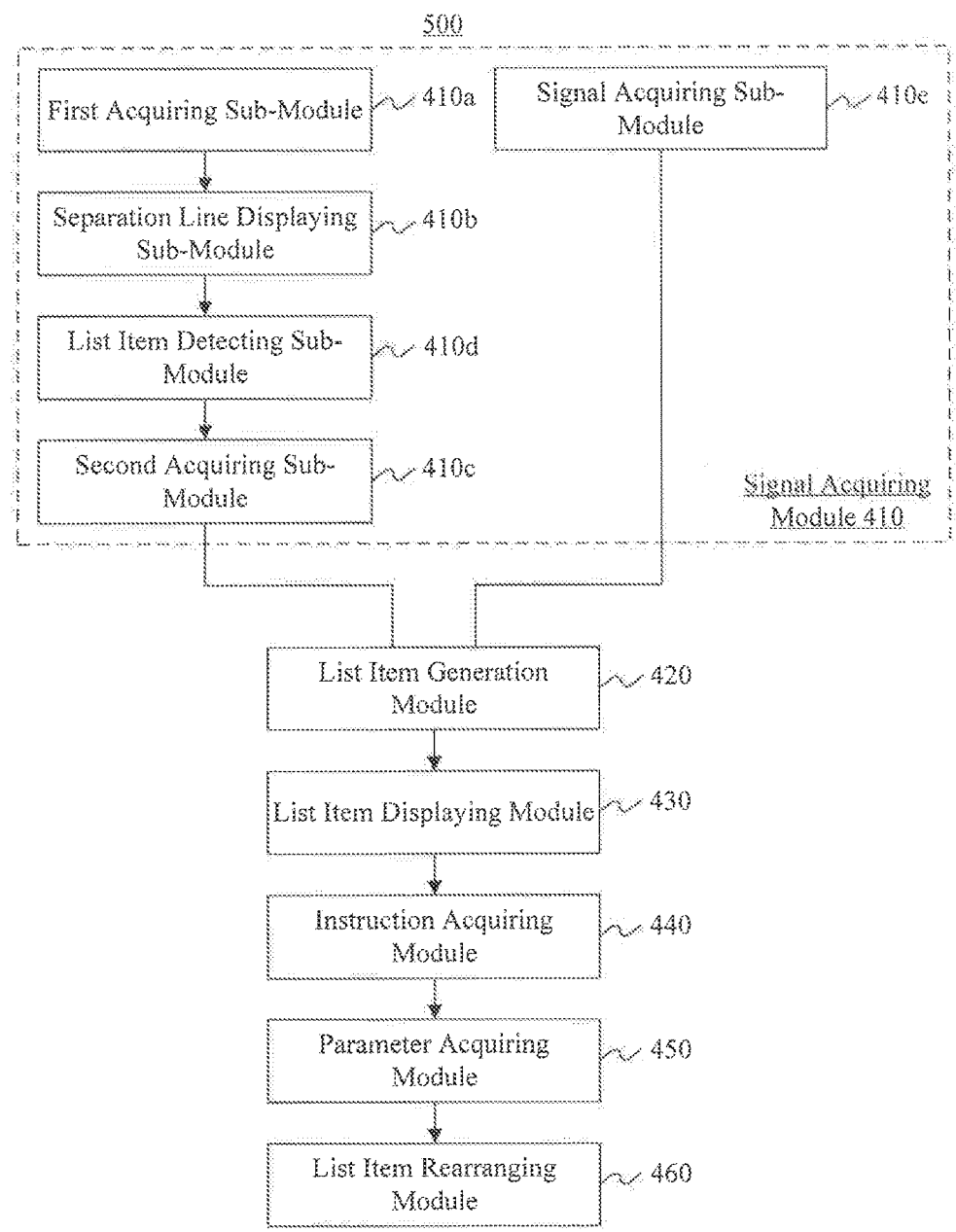
FIG. 5 is a block diagram of a device for updating a list, according to an exemplary embodiment.

FIG. 5 is a block diagram of a device 500 for updating a list, according to an exemplary embodiment. The device 500 may be a part or a whole of an electronic device, such as a mobile phone, a tablet, an e-book reader, a multimedia player, a personal digital assistant and the like, and may be implemented as software, or hardware, or a combination of the both. The device 500 includes the signal acquiring module 410, the list item generation module 420, and the list item displaying module 430 (FIG. 4).

In one exemplary embodiment, the signal acquiring module 410 includes a first acquiring sub-module 410a, a separation line displaying sub-module 410b, and a second acquiring sub-module 410c.

The first acquiring sub-module 410a is configured to acquire a tap signal generated from a tap operation on a separation line displayed in a first displaying state between the first list item and the second list item.

The separation line displaying sub-module 410b is configured to display the separation line in a second displaying state in response to the tap signal.

The second acquiring sub-module 410c is configured to acquire a sliding signal generated from a sliding operation on the separation line in the second displaying state.

In one exemplary embodiment, the signal acquiring module 410 includes a list item detecting sub-module 410d configured to, after acquiring the tap signal, detect whether the N list items are in a stationary state. The second acquiring sub-module 410c is further configured to, if the N list items are in the stationary state, display the separation line in the second displaying state in response to the tap signal.

In one exemplary embodiment, the signal-acquiring module 410 includes a signal acquiring sub-module 410e configured to acquire a first sliding signal corresponding to the first list item and a second sliding signal corresponding to the second list item.

For example, the first sliding signal is generated from a first sliding operation on the first list item in a sliding direction away from the second list item, the second sliding signal is generated from a second sliding operation on the second list item in a sliding direction away from the first list item, and a time difference between a first triggering moment of the first sliding signal and a second triggering moment of the second sliding signal is less than a predetermined time threshold.

In exemplary embodiments, the device 500 further includes an instruction acquiring module 440, a parameter acquiring module 450, and a list item rearranging module 460.

The instruction acquiring module 440 is configured to acquire an instruction for rearranging list items in the updated lists, e.g., M list items (M≥N+1 and being an integer).

The parameter acquiring module 450 is configured to, for each list item in the updated list, acquire a ranking parameter corresponding to the list item.

The list item rearranging module 460 is configured to rearrange the M list items according to their respective ranking parameters and a predetermined ranking condition.

For example, the predetermined ranking condition is arranging the list items in the updated list in an ascending order of the ranking parameters, or arranging the list items in the updated list in a descending order of the ranking parameters.

Figure 6:
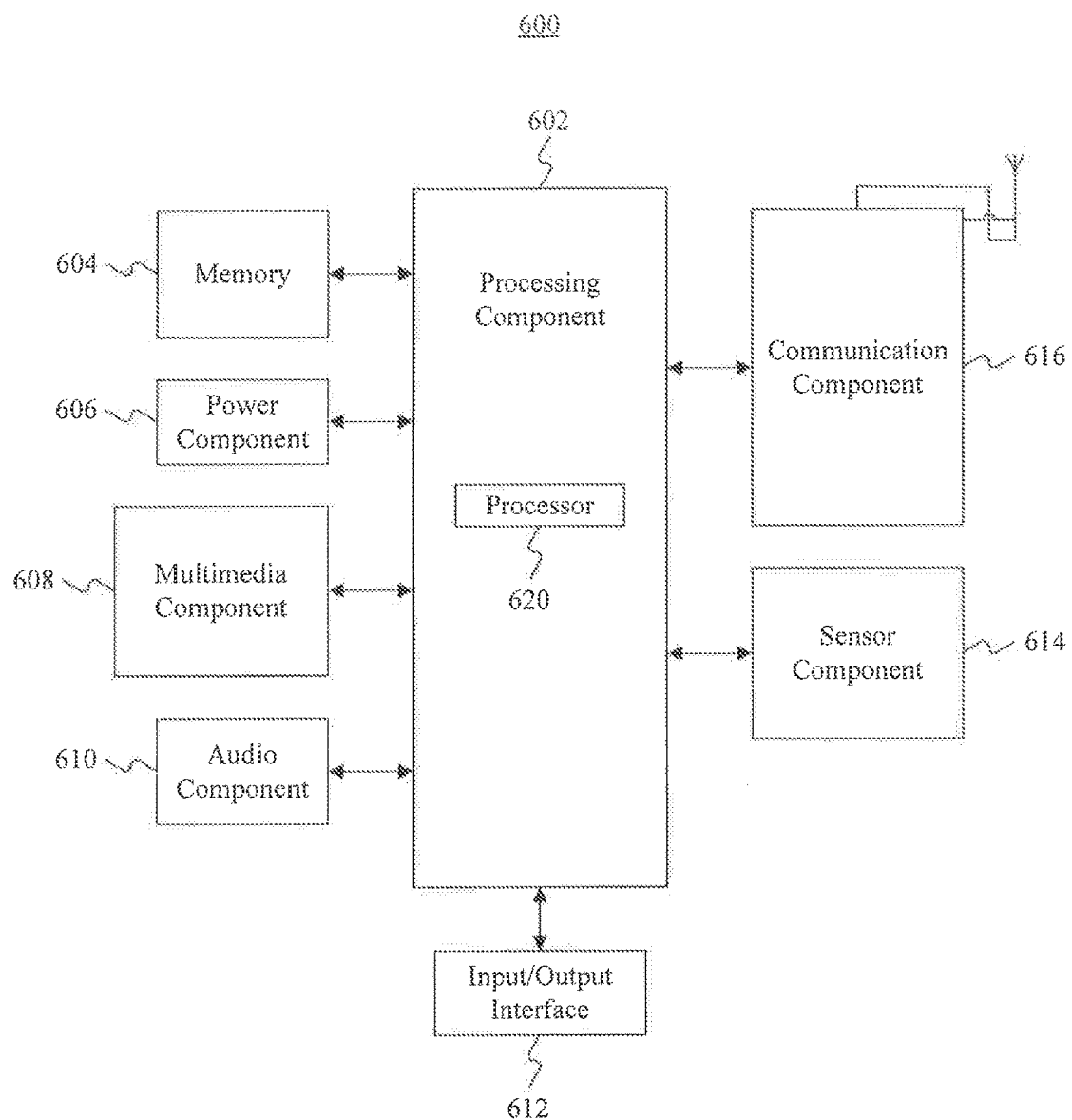
FIG. 6 is a block diagram of a device, according to an exemplary embodiment.

FIG. 6 is a block diagram of a device 600 for updating a list, according to an exemplary embodiment. For example, the device 600 may be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a tap wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to update a list displayed on the device, comprising:
   acquiring, by a processor in the device, a triggering signal with respect to a first list item and a second list item adjacent to the first list item among a plurality of list items of the list displayed on the device, the triggering signal being configured to trigger updating the list;
   obtaining, by the processor in the device, at least one updating list item according to list data for updating the list; and
   displaying, by the processor in the device, the at least one updating list item between the first list item and the second list item,
   wherein the acquiring of the triggering signal comprises:
   acquiring a first sliding signal generated from a first sliding operation on the first list item in a first sliding direction away from the second list item, and a second sliding signal generated from a second sliding operation on the second list item in a second sliding direction away from the first list item, and a time difference between a first triggering moment of the first sliding signal and a second triggering moment of the second sliding signal is less than a predetermined time threshold.

2. The method according to claim 1, wherein the acquiring of the triggering signal comprises:
   acquiring a tap signal generated from a tap operation on a separation line displayed in a first displaying state between the first list item and the second list item;
   displaying the separation line in a second displaying state after acquiring the tap signal; and
   acquiring a sliding signal generated from a sliding operation on the separation line in the second displaying state.

3. The method according to claim 1, further comprising:
   acquiring a tap signal generated from a tap operation on a separation line displayed in a first displaying state between the first list item and the second list item;
   after acquiring the tap signal, detecting whether the plurality of list items are in a stationary displaying state; and
   if the plurality of list items are in the stationary displaying state, displaying the separation line in a second displaying state.

4. The method according to claim 1, further comprising:
   acquiring an instruction for rearranging list items in the updated list;
   for each list item in the updated list, acquiring a ranking parameter corresponding to the list item; and
   rearranging the list items in the updated list according to the respective ranking parameters of the list items in the updated list and a predetermined ranking condition;
   wherein the predetermined ranking condition is one of arranging the list items in the updated list in an ascending order of the ranking parameters, or arranging the list items in the updated list in a descending order of the ranking parameters.

5. A device, comprising:
   a processor; and
   a memory for storing instructions executable by the processor;
   wherein the processor is configured to:
   acquire a triggering signal with respect to a first list item and a second list item adjacent to the first list item among a plurality of list items of a list displayed on the device, the triggering signal being configured to trigger updating the list;
   obtain at least one updating list item according to list data for updating the list; and
   display the at least one updating list item between the first list item and the second list item,
   wherein in acquiring the triggering signal, the processor is configured to:
   acquire a first sliding signal generated from a first sliding operation on the first list item in a first sliding direction away from the second list item, and a second sliding signal generated from a second sliding operation on the second list item in a second sliding direction away from the first list item, and a time difference between a first triggering moment of the first sliding signal and a second triggering moment of the second sliding signal is less than a predetermined time threshold.

6. The device according to claim 5, wherein the processor is further configured to:
   acquire a tap signal generated from a tap operation on a separation line displayed in a first displaying state between the first list item and the second list item;
   display the separation line in a second displaying state after acquiring the tap signal; and
   acquire a sliding signal generated from a sliding operation on the separation line in the second displaying state.

7. The device according to claim 5, wherein the processor is further configured to:
   acquire a tap signal generated from a tap operation on a separation line displayed in a first displaying state between the first list item and the second list item;
   after the tap signal is acquired, detect whether the plurality of list items are in a stationary displaying state; and
   if the plurality of list items are in the stationary displaying state, display the separation line in a second displaying state.

8. The device according to claim 5, wherein the processor is further configured to:
   acquire an instruction for rearranging list items in the updated list;
   for each list item in the updated list, acquire a ranking parameter corresponding to the list item; and
   rearrange the list items in the updated list according to the respective ranking parameters of the list items in the updated list and a predetermined ranking condition;
   wherein the predetermined ranking condition is one of arranging the list items in the updated list in an ascending order of the ranking parameters, or arranging the list items in the updated list in a descending order of the ranking parameters.

9. A non-transitory computer-readable storage medium storing instructions that, when executed by a processor of a device, cause the device to perform a method for updating a list displayed on the device, the method comprising:
   acquiring a triggering signal with respect to a first list item and a second list item adjacent to the first list item among a plurality of list items of the list displayed on the device, the triggering signal being configured to trigger updating the list;
   obtaining at least one updating list item according to list data for updating the list; and
   displaying the at least one updating list item between the first list item and the second list item,
   wherein the acquiring of the triggering signal comprises:
   acquiring a first sliding signal generated from a first sliding operation on the first list item in a first sliding direction away from the second list item, and a second sliding signal generated from a second sliding operation on the second list item in a second sliding direction away from the first list item, and a time difference between a first triggering moment of the first sliding signal and a second triggering moment of the second sliding signal is less than a predetermined time threshold.

* * * * *